(12) United States Patent
Raghavan et al.

(10) Patent No.: US 11,646,506 B2
(45) Date of Patent: May 9, 2023

(54) TECHNIQUES FOR BEAM-SPECIFIC PHASE ADJUSTMENT IN NON-CO-LOCATED DUAL-POLARIZED ANTENNA ARRAYS

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Kobi Ravid, Closter, NJ (US); Robert Douglas, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 17/138,406

(22) Filed: Dec. 30, 2020

(65) Prior Publication Data
US 2022/0209428 A1   Jun. 30, 2022

(51) Int. Cl.
| | | |
|---|---|---|
| *H01Q 21/24* | (2006.01) | |
| *H01Q 5/28* | (2015.01) | |
| *H01Q 3/38* | (2006.01) | |
| *H04B 7/10* | (2017.01) | |
| *H04B 7/0413* | (2017.01) | |

(52) U.S. Cl.
CPC ............ *H01Q 21/245* (2013.01); *H01Q 3/38* (2013.01); *H01Q 5/28* (2015.01); *H04B 7/10* (2013.01); *H04B 7/0413* (2013.01)

(58) Field of Classification Search
CPC .......... H04B 7/0413; H04B 7/10; H01Q 3/38; H01Q 5/28; H01Q 21/245
See application file for complete search history.

(56) References Cited

U.S. PATENT DOCUMENTS

| | | | |
|---|---|---|---|
| 2011/0150052 A1 | 6/2011 | Erell et al. | |
| 2016/0065388 A1* | 3/2016 | Kakishima | ........... H04B 17/391 370/329 |
| 2017/0288758 A1* | 10/2017 | Kakishima | ............ H04W 16/28 |
| 2018/0062811 A1* | 3/2018 | Akkarakaran | ............ H04L 1/00 |
| 2019/0097703 A1* | 3/2019 | Nilsson | .................... H04B 7/10 |

OTHER PUBLICATIONS

Bell A-L.S., et al., "Considerations on CSI Feedback Enhancements for High-Priority Antenna Configurations", 3GPP TSG-RAN WG1 #66, 3GPP Draft, R1-112420, 3rd Generation Partnership Project (3GPP), Mobile Competence Centre, 650, Route Des Lucioles, F-06921 Sophia-Antipolis Cedex, France, vol. RAN WG1, No. Athens, Greece, Aug. 22-Aug. 26, 2011, Aug. 18, 2011 (Aug. 18, 2011), 7 Pages, XP050537814, [retrieved on Aug. 18, 2011], Section 5, the whole document.
International Search Report and Written Opinion—PCT/US2021/062658—ISA/EPO—Apr. 7, 2022.

* cited by examiner

*Primary Examiner* — David B Lugo
(74) *Attorney, Agent, or Firm* — Arent Fox, LLP

(57) ABSTRACT

Aspects described herein relate to receiving, from a device, a first reference signal transmitted using a first set of antenna elements over a first polarization, receiving, from the device, a second reference signal transmitted using a second set of antenna elements over a second polarization, determining, based on the first reference signal and the second reference signal, an inter-polarization phase adjustment to be applied to signals transmitted from the first set of antenna elements or the second set of antenna elements, and transmitting, to the device, an indication of the inter-polarization phase adjustment.

30 Claims, 8 Drawing Sheets

TECHNIQUES FOR BEAM-SPECIFIC PHASE ADJUSTMENT IN NON-CO-LOCATED DUAL-POLARIZED ANTENNA ARRAYS

BACKGROUND

Aspects of the present disclosure relate generally to wireless communication systems, and more particularly, to performing phase adjustments for antenna arrays in wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, a device, such as a base station, may be equipped with large antenna arrays of non-co-located dual-polarized antenna elements to provide high signal gain in communicating with other devices, such as multiple user equipment (UEs).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication by a first device is provided. The method includes receiving, from a second device, a first reference signal transmitted using a first set of antenna elements over a first polarization, receiving, from the second device, a second reference signal transmitted using a second set of antenna elements over a second polarization, determining, based on the first reference signal and the second reference signal, an inter-polarization phase adjustment to be applied to signals transmitted from the first set of antenna elements or the second set of antenna elements, and transmitting, to the second device, an indication of the inter-polarization phase adjustment.

According to another aspect, a method for wireless communication at a first device is provided. The method includes transmitting, to a second device, a first reference signal using a first set of antenna elements of the first device over a first polarization, transmitting, to the second device, a second reference signal using a second set of antenna elements of the first device over a second polarization, receiving, from the second device, an indication of an inter-polarization phase adjustment, and applying, to at least one of the first set of antenna elements or the second set of antenna elements, the inter-polarization phase adjustment for communicating with the second device.

In another example, an apparatus for wireless communication is provided that includes a transceiver, a memory configured to store instructions, and one or more processors communicatively coupled with the memory and the transceiver. The one or more processors are configured to receive, from a device, a first reference signal transmitted using a first set of antenna elements over a first polarization, receive, from the device, a second reference signal transmitted using a second set of antenna elements over a second polarization, determine, based on the first reference signal and the second reference signal, an inter-polarization phase adjustment to be applied to signals transmitted from the first set of antenna elements or the second set of antenna elements, and transmit, to the device, an indication of the inter-polarization phase adjustment.

In a further example, an apparatus for wireless communication is provided that includes a transceiver, a memory configured to store instructions, and one or more processors communicatively coupled with the memory and the transceiver. The one or more processors are configured to transmit, to a device, a first reference signal using a first set of antenna elements of the apparatus over a first polarization, transmit, to the device, a second reference signal using a second set of antenna elements of the apparatus over a second polarization, receive, from the device, an indication of an inter-polarization phase adjustment, and apply, to at least one of the first set of antenna elements or the second set of antenna elements, the inter-polarization phase adjustment for communicating with the device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
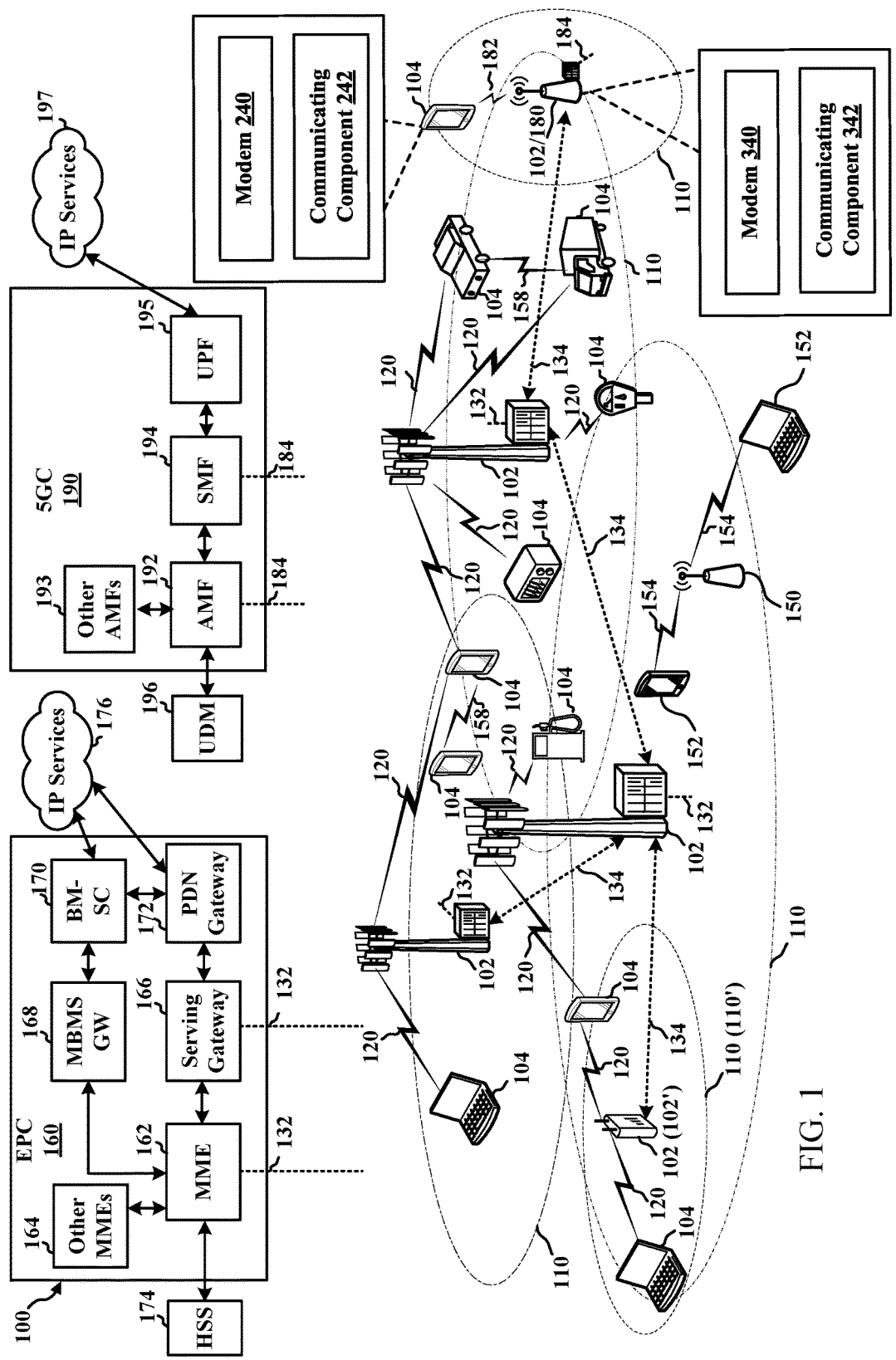
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to performing phase adjustment for certain antenna elements in non-co-located polarized antenna arrays. In some wireless communication technologies, such as fifth generation (5G) new radio (NR), a base station can typically have a co-located dual-polarized antenna array, which can include an array of dual-polarized patch antenna elements with either uniform or non-uniform inter-antenna element spacing, such as one or more 32-by-four matrices of antenna elements. Such antenna arrays can allow for achieving enhanced polarization multiple-input multiple-output (MIMO) gains, which can be used in the second wave of millimeter wave deployments at frequency range 2 (FR2), defined in 5G NR, and may be used in FR4 (e.g., 52.6-114.25 gigahertz) and beyond. As more antenna elements are used, feedline crossings can become more complicated or difficult to avoid. For example, hardware design can become more difficult, impedance matching can become more difficult, antenna efficiencies can decrease, etc. One possible solution can be to use non-co-located polarizations that avoid feedline crossings.

For example, some advantages of non-co-located arrays over co-located arrays can include that non-co-located arrays can allow a better thermal management than co-located arrays as the antenna elements are distinct, non-co-located arrays can allow for easier designs as feedline crossings are minimized (especially important for large antenna arrays), non-co-located arrays can be more uncorrelated than co-located arrays (e.g., coupling across antenna layers can be less), which can allow for non-polarization/spatial multiple-input multiple-output (MIMO) gains. Some disadvantages of non-co-located arrays as compared to co-located arrays can include that non-co-located arrays can consume more area and thus more printed circuit board (PCB) material than co-located arrays, radiated testing in the chamber such as those used for compliance and regulatory aspects can be difficult for non-co-located arrays due to the centers of antenna arrays being different, depending on size of array, non-co-located arrays can be excited by same/different clusters in the channel differently, which can lead to perhaps some diminished polarization MIMO gains, co-located arrays may be better for co-phasing of signals across two polarizations (e.g., rank-one operation), for smaller/moderate sized arrays, imbalance between layers due to ground and housing could be higher for non-co-located arrays.

Due to the various advantages and disadvantages of each antenna configuration, base stations (or other devices, such as customer premises equipment (CPE), user equipment (UE), etc.) may be configured with one or more of co-located dual-polarized antenna arrays or non-co-located dual-polarized antenna arrays. For non-co-located dual-polarized antenna arrays, signals transmitted from different polarizations that are located at different physical antenna panels may exhibit a different beam angle with respect to a receiving device or a reflector from which the beam is reflected. As such, in rank-one communications where both antennas are transmitting the same signal using beams with different steering angles, the relative phases of the received signals may be offset when received by the receiving device.

Accordingly, in aspects described herein, the device having the non-co-located dual-polarized antenna array can apply a beam-specific phase adjustment to signals transmitted by antenna elements of a non-co-located dual-polarized antenna array that are located on different panels to mitigate the geometric difference in orientation between the two polarized antenna arrays in rank-one communications. In one example, the transmitting device can transmit reference signals from each of the two polarized antenna arrays, which a receiving device can receive and determine a relative phase difference between the reference signal (also referred to herein as an "inter-polarization phase adjustment"). The receiving device can report this phase difference to the transmitting device, which can apply the phase difference in transmitting signals from the two polarized antenna arrays in rank-one communications. This can allow the receiving device to receive rank-one communications without compensating for a difference in phase in the rank-one communications, which can improve the rate and/or reliability of the rank-one communications in non-co-located dual-polarized antenna array configurations.

The described features will be presented in more detail below with reference to FIGS. 1-8.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for determining or reporting an indication of an inter-polarization phase adjustment to another device, such as a base station 102, in accordance with aspects described herein. In addition, some nodes may have a modem 340 and communicating component 342 for applying an inter-polarization phase adjustments to antenna elements in a non-co-located dual-polarized antenna array, in accordance with aspects described herein. Though a UE 104 is shown as having the modem 240 and communicating component 242 and a base station 102/gNB 180 is shown as having the modem 340 and communicating component 342, this is one illustrative example, and substantially any node or type of node may include a modem 240 and communicating component 242 and/or a modem 340 and communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 342 can transmit reference signals from different sets of antenna elements that have different polarizations at a non-co-located dual-polarized antenna array. In an example, communicating component 242 can receive the reference signals, and can determine an inter-polarization phase difference between the reference signals. Communicating component 242 can transmit an indication of the inter-polarization phase difference to the communicating component 342 for applying to signals transmitted over the corresponding sets of antenna elements. This can account for difference in beam angle between the signals transmitted over the sets of antenna elements, which may be caused by difference in physical location of the antenna elements on the antenna panels, which can be exacerbated by a reflector, etc. In any case, with the inter-polarization phase difference applied, communicating component 342 can transmit signals in rank-one communications to communicating component 242, and communicating component 242 can receive the rank-one communications as a single signal that is transmitted as multiple different signals with phase aligned based on the inter-polarization phase difference.

Figure 2:
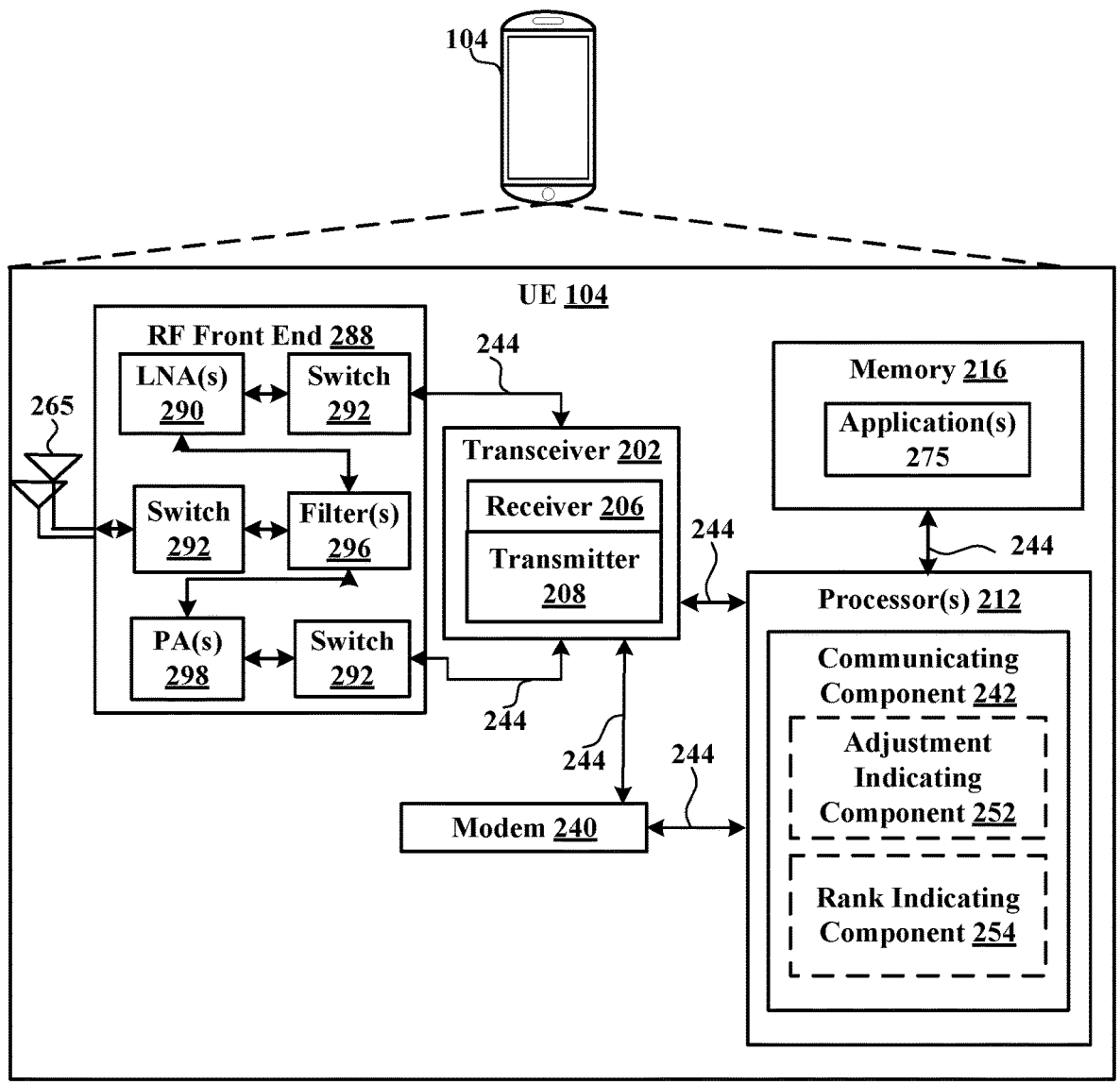
FIG. 2 is a block diagram illustrating an example of a UE, in accordance with various aspects of the present disclosure.
Figure 3:
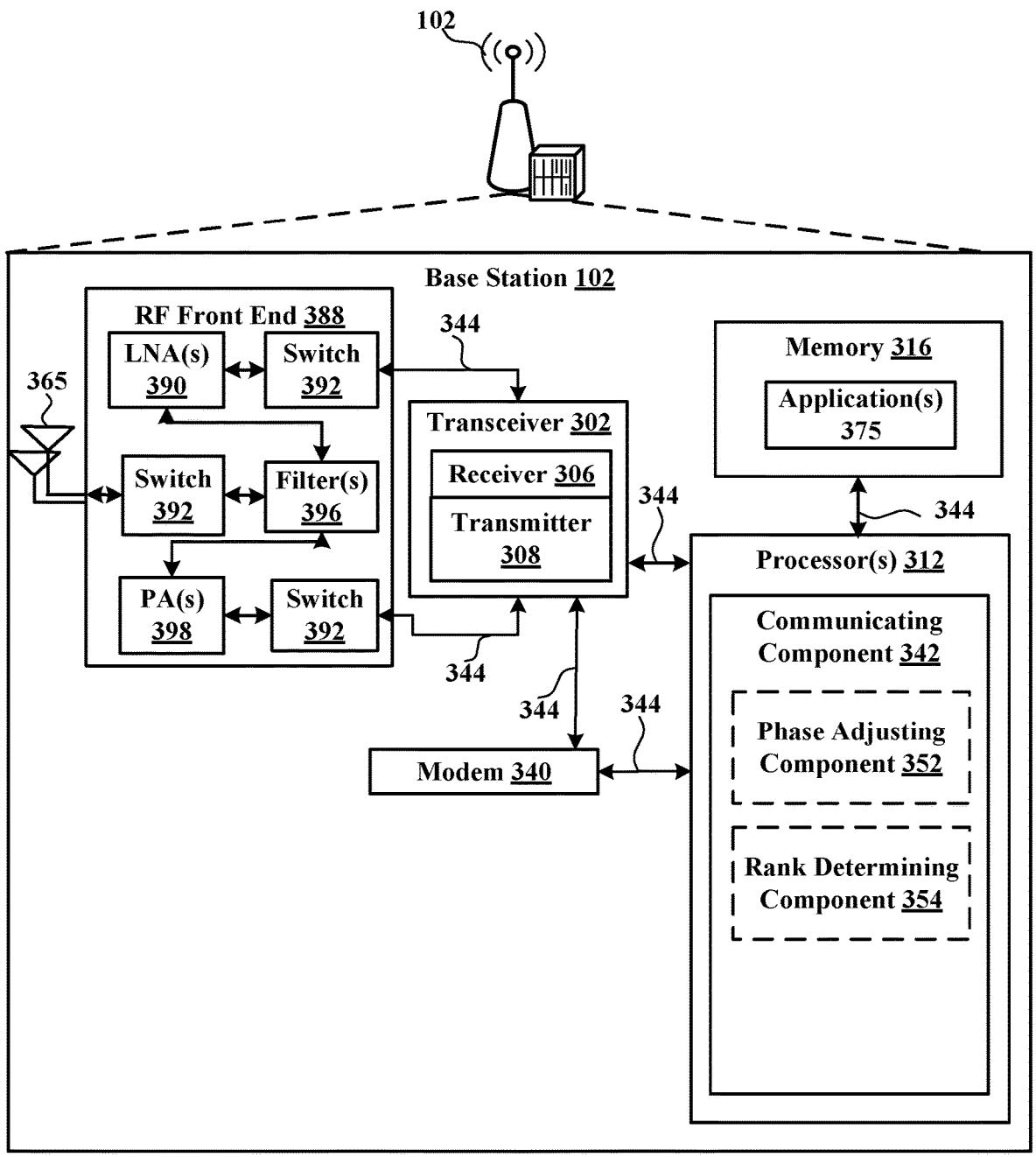
FIG. 3 is a block diagram illustrating an example of a base station, in accordance with various aspects of the present disclosure.
Figure 4:
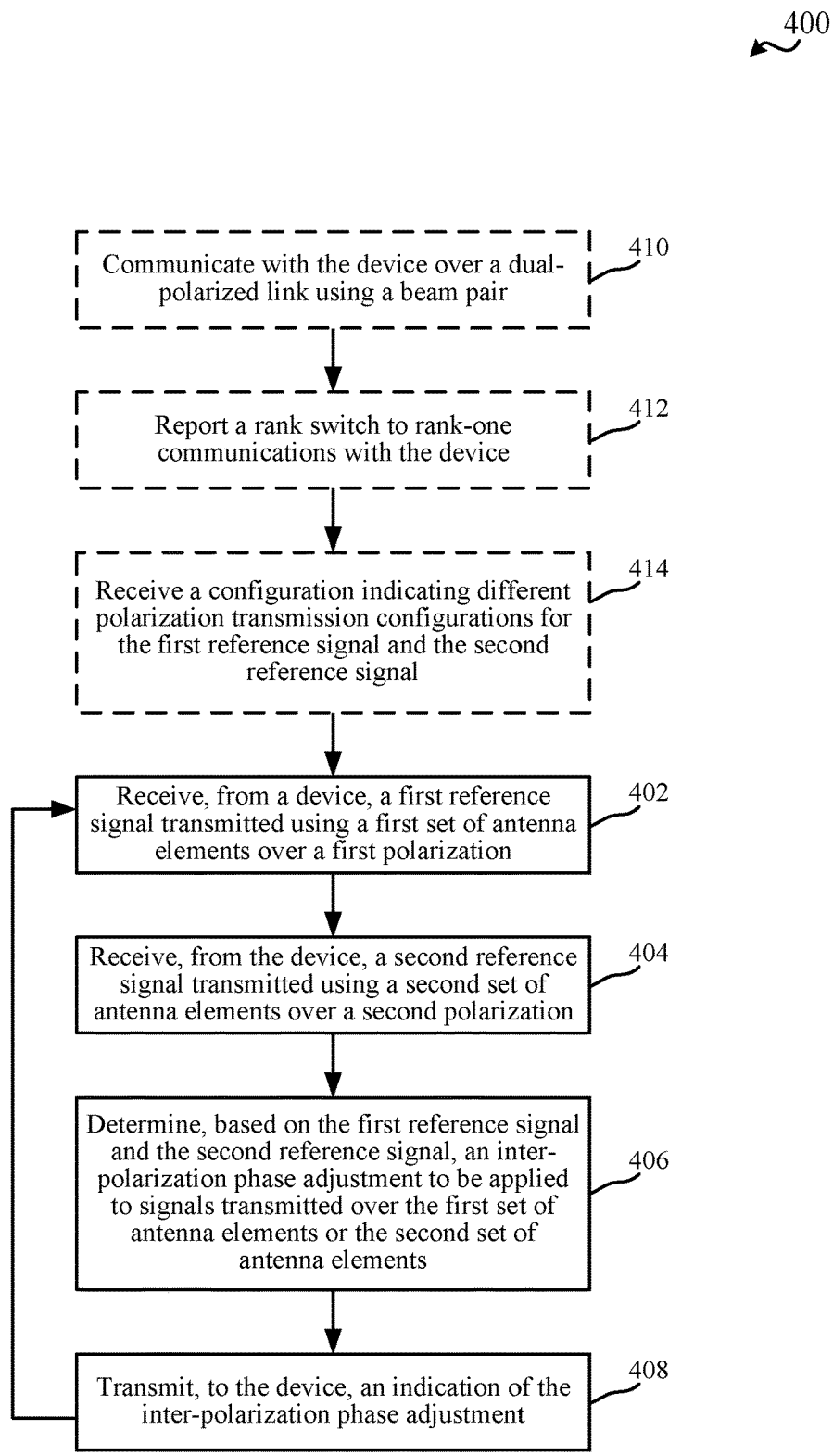
FIG. 4 is a flow chart illustrating an example of a method for determining and reporting an inter-polarization phase adjustment to be applied to signals transmitted from different antenna elements in a non-co-located dual-polarized antenna array, in accordance with aspects described herein.
Figure 5:
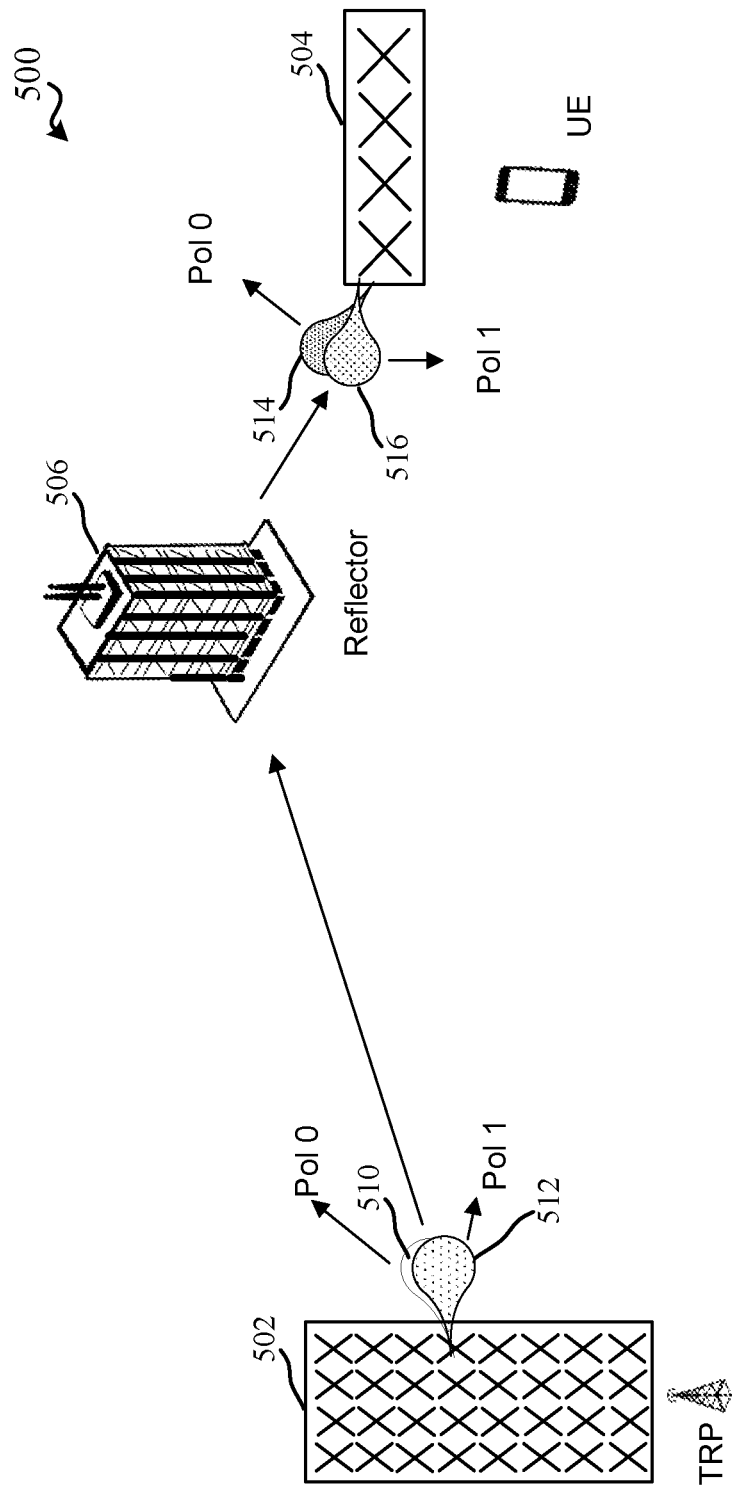
FIG. 5 illustrates an example of a system for performing wireless communications using a co-located dual-polarized antenna array, in accordance with aspects described herein.
Figure 6:
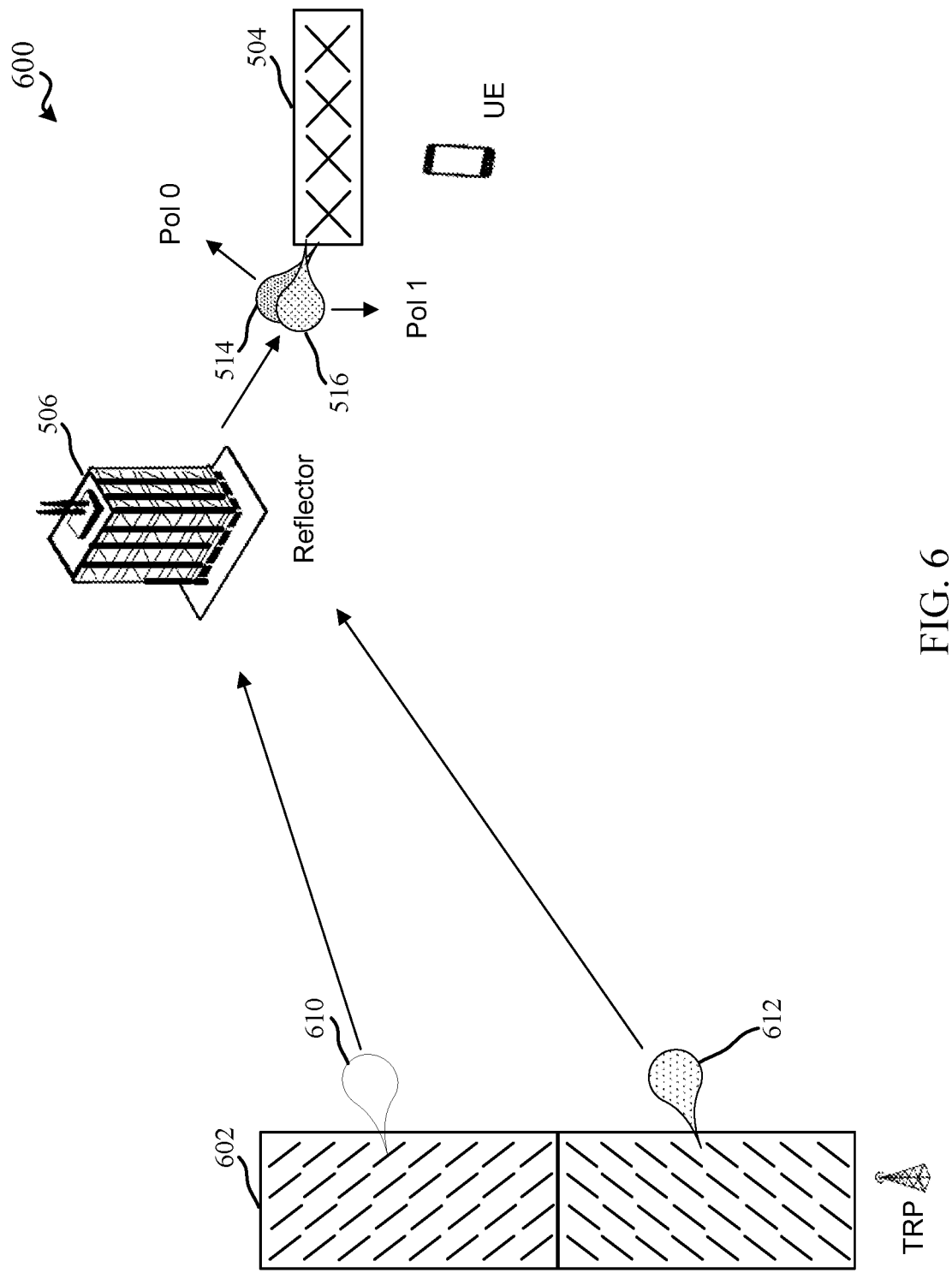
FIG. 6 illustrates an example of a system for performing wireless communications using a non-co-located dual-polarized antenna array, in accordance with aspects described herein.
Figure 7:
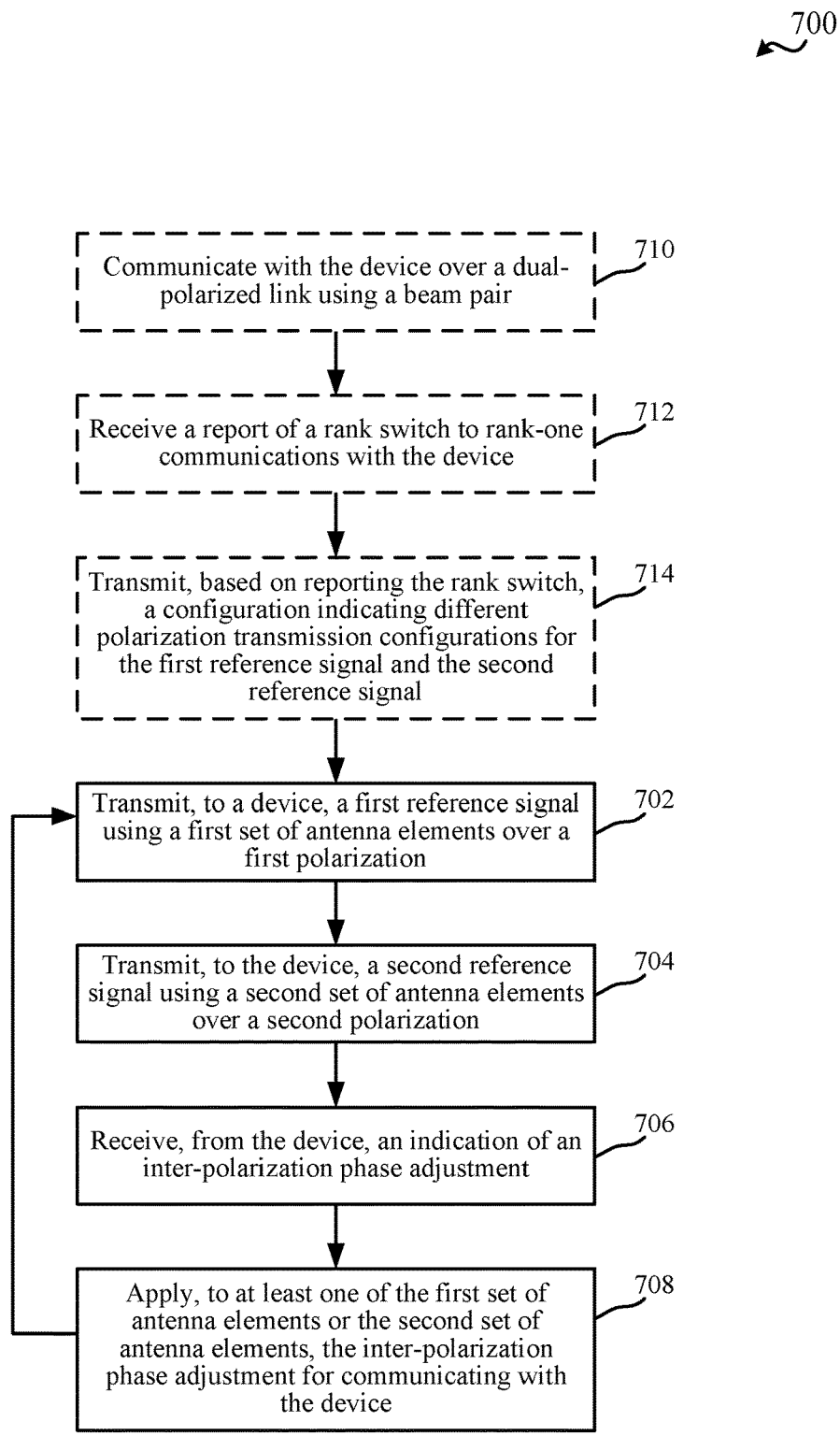
FIG. 7 illustrates a flow chart of an example of a method for receiving and applying an inter-polarization phase adjustment to signals transmitted by multiple antenna elements, in accordance with aspects described herein.

Turning now to FIGS. 2-8, aspects are depicted with reference to one or more components and one or more methods that may perform the actions or operations described herein, where aspects in dashed line may be optional. Although the operations described below in FIGS. 4 and 7 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for determining or reporting an indication of an inter-polarization phase adjustment to another device, such as a base station 102, in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include an adjustment indicating component 252 for indicating an inter-polarization phase adjustment to be applied by a device (e.g., a base station 102) to sets of antenna elements, and/or a rank indicating component 254 for reporting a rank switch to the device.

In an aspect, the processor(s) 212 may correspond to one or more of the processors described in connection with the UE in FIG. 8. Similarly, the memory 216 may correspond to the memory described in connection with the UE in FIG. 8.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and communicating component 342 for applying an inter-polarization phase adjustments to antenna elements in a non-co-located dual-polarized antenna array, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, communicating component 342 can optionally include a phase adjusting component 352 for adjusting a phase of signals transmitted to a device over one or more sets of antenna elements based on a received inter-polarization phase adjustment, and/or a rank determining component 354 for determining a rank switch in communications with the device, in accordance with aspects described herein.

In an aspect, the processor(s) 312 may correspond to one or more of the processors described in connection with the base station in FIG. 8. Similarly, the memory 316 may correspond to the memory described in connection with the base station in FIG. 8.

FIG. 4 illustrates a flow chart of an example of a method 400 for determining and reporting an inter-polarization phase adjustment to be applied to signals transmitted from different antenna elements in a non-co-located dual-polarized antenna array, in accordance with aspects described herein. In an example, a UE 104 can perform the functions described in method 400 using one or more of the components described in FIGS. 1-2. In some examples, other devices (e.g., CPE) capable of wireless communications with another device that uses non-co-located dual-polarized antenna arrays can perform the functions described in method 400 using one or more of the components described in FIGS. 1-2.

In method 400, at Block 402, a first reference signal transmitted using a first set of antenna elements over a first polarization can be received from a device. In an aspect, communicating component 242, e.g., in conjunction with processor(s) 212, memory 216, transceiver 202, etc., can receive, from the device (e.g., base station 102), the first reference signal transmitted using the first set of antenna elements over the first polarization. In an example, the first reference signal may be beamformed in a spatial direction by the device (e.g., base station 102) selectively applying power to antenna resources to achieve the spatial direction. The first reference signal can be transmitted by the base station 102 for the purposes of determining an inter-polarization phase adjustment for rank-one communications.

In method 400, at Block 404, a second reference signal transmitted using a second set of antenna elements over a second polarization can be received from the device. In an aspect, communicating component 242, e.g., in conjunction with processor(s) 212, memory 216, transceiver 202, etc., can receive, from the device (e.g., base station 102), the second reference signal transmitted using the second set of antenna elements over the second polarization. In an example, the second reference signal may be beamformed in a spatial direction by the device (e.g., base station 102) selectively applying power to antenna resources to achieve the spatial direction, which may be a similar or different spatial direction than the first reference signal. The second reference signal can be transmitted by the base station 102 for the purposes of determining an inter-polarization phase adjustment for rank-one communications as well. Various examples of antenna elements and corresponding panels or arrays are shown and described in FIGS. 5-6.

FIG. 5 illustrates an example of a system 500 for performing wireless communications using a co-located dual-polarized antenna array. System 500 can include a co-located dual-polarized antenna array 502 at a transmission/reception point (TRP), where a TRP can be a base station 102 or a TRP operated by a base station 102, etc. System 500 can also include a co-located dual-polarized antenna array 504 at a UE, and/or a reflector 506 that reflects signals from dual-polarized antenna array 502 to dual-polarized antenna array 504. The reflector 506 can include a stationary object, such as a building or other structure, tree, etc., a mobile object, such as an automobile, etc., that exists in space and reflect signals from the dual-polarized antenna array 502 to the dual-polarized antenna array 504.

Dual-polarized antenna array 502 can be a co-located dual-polarized antenna array of 32 (for example) dual-polarized antenna elements (in an eight-by-four configuration) that are co-located on a single antenna panel. A TRP can include one or more such arrays. A UE can also include one or more such panels. Each dual-polarized antenna element in antenna array 502 can include two polarizations, represented by each line of each 'X,' which can each be used to transmit signals at orthogonal polarizations. As shown in FIG. 5, dual-polarized antenna array 502 can transmit a beamformed signal from a single antenna element on polarization 0 510 (often called as the co-polarization component) and polarization 1 512 (often called as the cross-polarization component), which can include transmitting the signals along a same direction using both polarizations of the dual-polarized antenna element. Dual-polarized antenna array 504 of the UE can similarly receive the signals along the same direction at a single antenna element on polarization 0 514 and polarization 1 516.

FIG. 6 illustrates an example of a system 600 for performing wireless communications using a non-co-located dual-polarized antenna array. System 600 can include a non-co-located dual-polarized antenna array 602 at a transmission/reception point (TRP), where a TRP can be a base station 102 or a TRP operated by a base station 102, etc. System 600 can also include a co-located dual-polarized antenna array 504 at a UE, and/or a reflector 506 that reflects signals from non-co-located dual-polarized antenna array 602 to co-located dual-polarized antenna array 504. The reflector 506 can include a stationary object, such as a glass or a metallic object in a building or other structure, such as building corners, trees, etc., a mobile object, such as an automobile, etc., that exists in space and reflect signals from the non-co-located dual-polarized antenna array 602 to the co-located dual-polarized antenna array 504.

Dual-polarized antenna array 602 can be a non-co-located dual-polarized antenna array of 32 (for example) dual-polarized antenna elements (in two eight-by-four configurations) that are non-co-located on two antenna panels. A TRP can include one or more such panels. Each dual-polarized antenna element in antenna array 602 can include a single polarization from a first panel at a first polarization and a single polarization from a second panel at a second polarization, which can each be used to transmit signals at different polarizations. As shown in FIG. 6, dual-polarized antenna array 602 can transmit a beamformed signal from a single antenna element at 610 and another single antenna element at 612, which can include transmitting the signals using different beams, which may have different geometric properties based on the antenna elements transmitting signals 610 and 612 being located in different physical positions or locations on the antenna array. Dual-polarized antenna array 504 of the UE can receive the signals at a single antenna element on polarization 0 514 and polarization 1 516. Due to the different positions or locations of the antenna elements, the signals 610 and 612, even when transmitted as the same signal in rank-one communications, may have different phases. As described above and further herein, the base station 102 can transmit the first and second reference signals to allow the UE 104 to determine and report the inter-polarization phase adjustment so that the base station 102 can adjust signals transmitted over the corresponding antenna elements.

In method 400, at Block 406, an inter-polarization phase adjustment to be applied to signals transmitted over the first set of antenna elements or the second set of antenna elements can be determined based on the first reference signal and the second reference signal. In an aspect, adjustment indicating component 252, e.g., in conjunction with processor(s) 212, memory 216, transceiver 202, communicating component 242, etc., can determine, based on the first reference signal and the second reference signal, the inter-polarization phase adjustment to be applied to signals transmitted over the first set of antenna elements or the second set of antenna elements. For example, adjustment indicating component 252 can determine the inter-polarization phase adjustment as a phase difference between the first reference signal and the second reference signal as received from the device.

For example, in the case of non-co-located dual-polarized arrays, in co-phasing energy with the use of same/different beams across the two polarizations (e.g., in rank-one communications) at the receiving device (e.g., at UE 104), the receiving device can benefit from a beam-dependent phase adjustment of the signal coming from the two polarizations of the transmitting device (e.g., the base station 102 or TRP or gNB, etc.). The determined phase adjustment can compensate for path distance differences between the signals, such as geometric difference in orientation between the two polarized antenna arrays (at the transmitting device, e.g., base station 102, and receiving device, e.g., UE 104) relative to a reflector or cluster in the channel. Such a path distance difference may be beam angle dependent (at the transmitting device, e.g., base station 102, and receiving device, e.g., UE 104) or also dependent on relative mobility direction of reflector/cluster or the receiving device (e.g., UE 104).

In method 400, at Block 408, an indication of the inter-polarization phase adjustment can be transmitted to the device. In an aspect, adjustment indicating component 252, e.g., in conjunction with processor(s) 212, memory 216, transceiver 202, communicating component 242, etc., can transmit, to the device (e.g., base station 102), the indication of the inter-polarization phase adjustment, which may allow the device to apply the inter-polarization phase adjustment to co-phase signals transmitted from the corresponding antenna elements to the UE 104. For example, communicating component 242 can transmit the indication of the inter-polarization phase adjustment in channel state feedback (e.g., in a rank indicator (RI) in channel state information (CSI) feedback), which can be transmitted over an uplink control channel, or in higher-layer signaling, such as radio resource control (RRC) signaling, etc. In addition, for example, the indication can include an explicit value for the phase adjustment, an enumeration to indicate an approximate value for the phase adjustment (corresponding to a coarse/fine quantization of a set of phase shifters), etc. In another example, adjustment indicating component 252 may indicate, to the base station 102, the phases of the received reference signals, and the base station 102 can determine the inter-polarization phase adjustment to apply to subsequent signal transmissions.

In an example, the reference signals can be received for determining the inter-polarization phase adjustment based on a rank switch to rank-one communications. Accordingly, in method 400, optionally at Block 410, the device can be communicated with over a dual-polarized link using a beam pair. In an aspect, communicating component 242, e.g., in conjunction with processor(s) 212, memory 216, transceiver 202, etc., can communicate with the device (e.g., base station 102) over the dual-polarized link using the beam pair. For example, communicating component 242 can receive signals from the base station 102 from different sets of antenna elements based on respective beams, where the different sets of antenna elements may include antenna elements using the first polarization and antenna elements using the second polarization from non-co-located antenna panels. Communicating using dual-polarized antenna elements can improve spatial and diversity MIMO gains, as described.

In method 400, optionally at Block 412, a rank switch to rank-one communications with the device can be reported. In an aspect, rank indicating component 254, e.g., in conjunction with processor(s) 212, memory 216, transceiver 202, communicating component 242, etc., can report the rank switch to rank-one communications with the device. For example, rank indicating component 254 can report a rank switch based on various determinations, such as to improve communication quality with the base station 102 where channel metrics degrade below a threshold. The base station 102 can perform rank-one communications by transmitting the same signal from multiple antenna elements, which may include antenna elements having different polarizations. As described, where the antenna elements have different polarizations and are on non-co-located panels, the beamformed signals transmitted from the multiple antenna elements may have different phases when received at the UE 104. Accordingly, the base station 102 can transmit the reference signals to facilitate determination and reporting of the phase difference.

In addition, in an example, in method 400, optionally at Block 414, a configuration indicating different polarization transmission configurations for the first reference signal and the second reference signal can be received. In an aspect, adjustment indicating component 252, e.g., in conjunction with processor(s) 212, memory 216, transceiver 202, communicating component 242, etc., can receive the configuration indicating the different polarization transmission configurations for the first reference signal and the second reference signal. For example, the configuration can indicate a beam used to transmit the first reference signal and the second reference signal, frequency or time resources used to transmit the first reference signal and the second reference signal, resources for indicating the inter-polarization phase difference between the first reference signal and the second reference signal, etc. In one example, adjustment indicating component 252 may receive the configuration based on reporting the rank switch or the base station 102 otherwise determining to request the inter-polarization phase adjustment for applying to signals transmitted from the different antenna elements.

In addition, for example, method 400 can proceed from Block 408 to Block 402 (or to one or more of Blocks 410, 412, 414) to continually receive reference signals for determining inter-polarization phase adjustment. In this regard, as the UE 104 or reflector relatively moves with respect to the device (e.g., with respect to base station 102), and channel conditions may change, adjustment indicating component 252 may continue to measure reference signals and report the inter-polarization phase adjustment to use in transmitting signals to the UE 104 from multiple antenna elements in non-co-located dual-polarized antenna arrays.

FIG. 7 illustrates a flow chart of an example of a method 700 for receiving and applying an inter-polarization phase adjustment to signals transmitted by multiple antenna elements, in accordance with aspects described herein. In an example, a base station 102 can perform the functions described in method 700 using one or more of the components described in FIGS. 1 and 3. In some examples, any other device capable of wireless communications with a device that supports multiple antenna elements can perform the functions described in method 700 using one or more of the components described in FIGS. 1 and 3.

In method 700, at Block 702, a first reference signal can be transmitted to a device using a first set of antenna elements over a first polarization. In an aspect, communicating component 342, e.g., in conjunction with processor(s) 312, memory 316, transceiver 302, etc., can transmit, to the device (e.g., UE 104), the first reference signal using the first set of antenna elements over the first polarization. In an example, the first reference signal may be beamformed in a spatial direction by the base station 102 selectively applying power to antenna resources to achieve the spatial direction of interest. The first reference signal can be transmitted by the base station 102 for the purposes of allowing the device (e.g., UE 104) to determine an inter-polarization phase adjustment for rank-one communications.

In method 700, at Block 704, a second reference signal transmitted to the device using a second set of antenna elements over a second polarization. In an aspect, communicating component 342, e.g., in conjunction with processor(s) 312, memory 316, transceiver 302, etc., can transmit, to the device (e.g., UE 104), the second reference signal using the second set of antenna elements over the second polarization. In an example, the second reference signal may be beamformed in a spatial direction by the base station 102 selectively applying power to antenna resources to achieve the spatial direction of interest, which may be a similar or different spatial direction than the first reference signal. The second reference signal can be transmitted by the base station 102 for the purposes of allowing the device (e.g., UE 104) to determine an inter-polarization phase adjustment for rank-one communications as well.

In method 700, at Block 706, an indication of an inter-polarization can be received from the device. In an aspect, phase adjusting component 352, e.g., in conjunction with processor(s) 312, memory 316, transceiver 302, communicating component 342, etc., can receive, from the device (e.g., from UE 104), the indication of the inter-polarization phase adjustment, which can be used for applying to signals transmitted over the first set of antenna elements or the second set of antenna elements. For example, phase adjusting component 352 can receive the indication of the inter-polarization phase adjustment as a phase difference between the first reference signal and the second reference signal as received from the device (e.g., UE 104). For example, phase adjusting component 352 can receive the indication of the inter-polarization phase adjustment in channel state feedback, which can be received over an uplink control channel, or in higher-layer signaling, such as RRC signaling, etc. In addition, for example, the indication can include an explicit value for the phase adjustment, an enumeration to indicate an approximate value for the phase adjustment, from which phase adjusting component 352 can determine the phase adjustment value, etc. In another example, phase adjusting component 352 may receive, from the device, the phases of the reference signals as received at the device, and phase adjusting component 352 can determine the inter-polarization phase adjustment to apply to subsequent signal transmissions.

In method 700, at Block 708, the inter-polarization phase adjustment can be applied, to at least one of the first set of antenna elements or the second set of antenna elements, for communicating with the device. In an aspect, phase adjusting component 352, e.g., in conjunction with processor(s) 312, memory 316, transceiver 302, communicating component 342, etc., can apply, to at least one of the first set of antenna elements or the second set of antenna elements, the inter-polarization phase adjustment for communicating with the device. For example, phase adjusting component 352 can apply the inter-polarization phase adjustment to one set of the antenna elements to align the phase with another one set of the antenna elements having a different polarization (or otherwise being located at a different position or location of the antenna panel).

In an example, the reference signals can be transmitted for determining the inter-polarization phase adjustment based on a rank switch to rank-one communications. Accordingly, in method 700, optionally at Block 710, the device can be communicated with over a dual-polarized link using a beam pair. In an aspect, communicating component 342, e.g., in conjunction with processor(s) 312, memory 316, transceiver 302, etc., can communicate with the device (e.g., UE 104) over the dual-polarized link using the beam pair. For example, communicating component 342 can transmit signals to the UE 104 from different sets of antenna elements based on respective beams, where the different sets of antenna elements may include antenna elements using the first polarization and antenna elements using the second polarization from non-co-located antenna panels. Communicating using dual-polarized antenna elements can improve spatial and diversity MIMO gains, as described.

In method 700, optionally at Block 712, a report of a rank switch to rank-one communications with the device can be received. In an aspect, rank determining component 354, e.g., in conjunction with processor(s) 312, memory 316, transceiver 302, communicating component 342, etc., can receive the report of the rank switch to rank-one communications with the device. The base station 102 can perform rank-one communications by transmitting the same signal from multiple sets of antenna elements, which may include antenna elements having different polarizations. As described, where the antenna elements have different polarizations and are on non-co-located panels, the beamformed signals transmitted from the multiple antenna elements may have different phase when received at the UE 104. Accordingly, the base station 102 can transmit the reference signals to facilitate determination and reporting of the phase difference.

In addition, in an example, in method 700, optionally at Block 714, a configuration indicating different polarization transmission configurations for the first reference signal and the second reference signal can be transmitted. In an aspect, phase adjusting component 352, e.g., in conjunction with processor(s) 312, memory 316, transceiver 302, communicating component 342, etc., can transmit the configuration indicating the different polarization transmission configurations for the first reference signal and the second reference signal. For example, the configuration can indicate a beam used to transmit the first reference signal and the second reference signal, frequency or time resources used to transmit the first reference signal and the second reference signal, resources for indicating the inter-polarization phase difference between the first reference signal and the second reference signal, etc. In one example, phase adjusting component 352 may transmit the configuration based on receiving the reporting of the rank switch or otherwise determining to request the inter-polarization phase adjustment for applying to signals transmitted from the different sets of antenna elements.

In addition, for example, method 700 can proceed from Block 708 to Block 702 (or to one or more of Blocks 710, 712, 714) to continually receive reference signals for determining inter-polarization phase adjustment. In this regard, as the device (e.g., UE 104 or reflector) moves location with respect to the base station 102, and channel conditions may change, phase adjusting component 352 may continue to transmit reference signals for determining and reporting the inter-polarization phase adjustment to use in transmitting signals to the device from multiple antenna elements in non-co-located dual-polarized antenna arrays at the base station 102.

In examples described above, a base station 102 and UE 104 establish a dual-polarized link with a certain beam pair. The UE 104 can report a rank switch (to low rank) via RI in CSI feedback. When switching to rank-one, base station 102 can offer reference signal from one polarization at base station side, allows UE 104 to estimate received signals and repeats this process with the second polarization at the base station side. UE 104 can report the inter-polarization phase adjustment to be used for co-phasing across polarizations. Base station 102 can use this information to perform co-phased transmissions on rank-one transmissions. Base station 102 and UE 104 repeat this process as beam pairs change, UE moves, channel environment (e.g., reflector) changes, etc.

Figure 8:
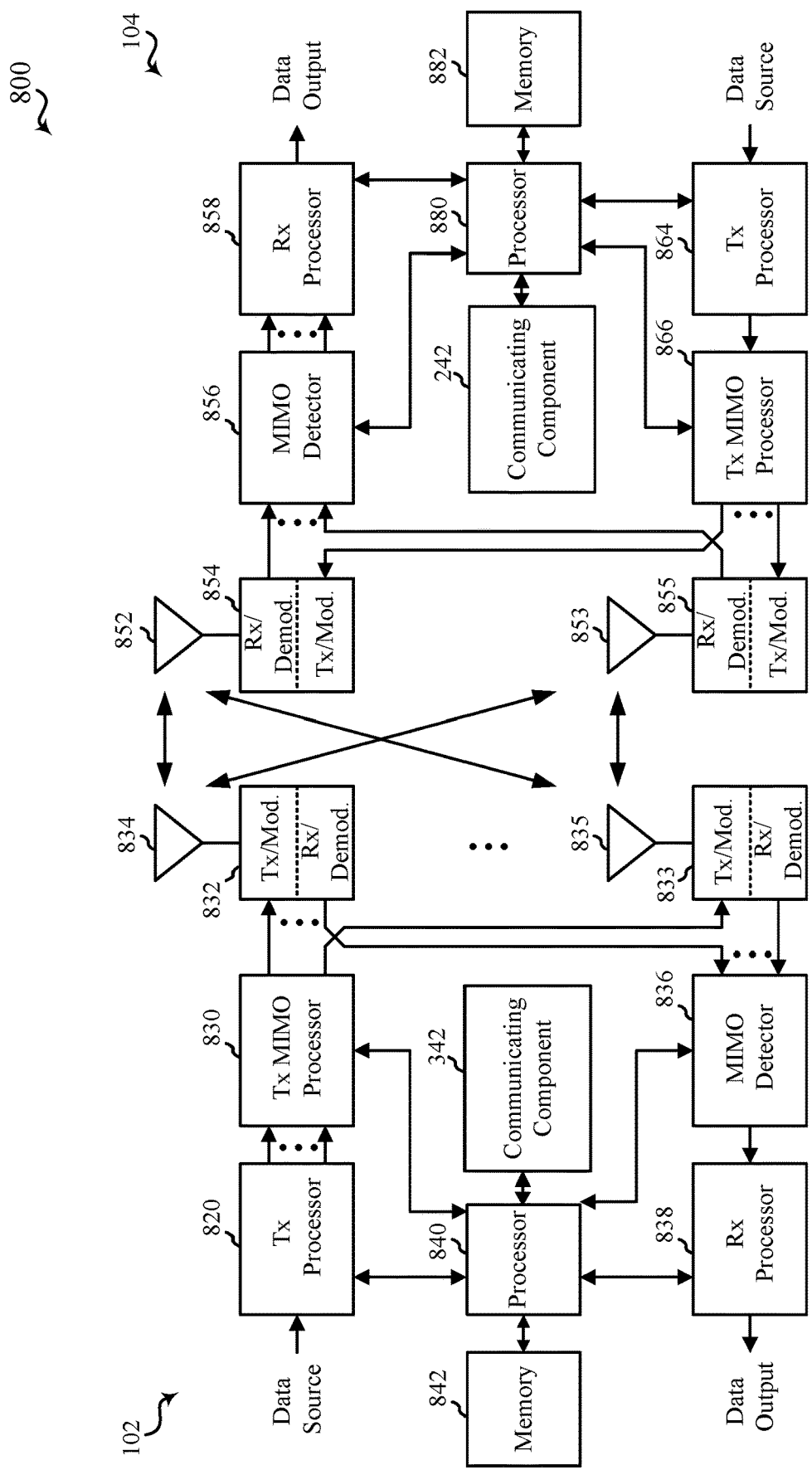
FIG. 8 is a block diagram illustrating an example of a MIMO communication system including a base station and a UE, in accordance with various aspects of the present disclosure.

FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1-2. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a communicating component 242 (see e.g., FIGS. 1 and 2).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 may in some cases execute stored instructions to instantiate a communicating component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 800.

The following aspects are illustrative only and aspects thereof may be combined with aspects of other embodiments or teaching described herein, without limitation.

Aspect 1 is a method for wireless communication at a first device including receiving, from a second device, a first reference signal transmitted using a first set of antenna elements over a first polarization, receiving, from the second device, a second reference signal transmitted using a second set of antenna elements over a second polarization, determining, based on the first reference signal and the second reference signal, an inter-polarization phase adjustment to be applied to signals transmitted from the first set of antenna elements or the second set of antenna elements, and transmitting, to the second device, an indication of the inter-polarization phase adjustment.

In Aspect 2, the method of Aspect 1 includes communicating with the second device over a dual-polarized link using a beam pair, and reporting a rank switch to rank-one communications between the first device and the second device, wherein receiving the first reference signal and the second reference signal are based on reporting the switch to the second device.

In Aspect 3, the method of Aspect 2 includes receiving, based on reporting the rank switch to the second device, a configuration indicating different polarization transmission configurations for the first reference signal and the second reference signal.

In Aspect 4, the method of Aspect 3 includes wherein receiving the first reference signal is based on a first beam indicated in the configuration and receiving the second reference signal is based on a second beam indicated in the configuration.

In Aspect 5, the method of any of Aspects 2 to 4 includes wherein reporting the rank switch includes reporting the rank switch to the second device in channel state feedback.

In Aspect 6, the method of any of Aspects 1 to 5 includes wherein determining the inter-polarization phase adjustment includes determining a phase difference between a first phase of the first reference signal relative to a second phase of the second reference signal.

In Aspect 7, the method of any of Aspects 1 to 6 includes wherein receiving the first reference signal includes receiving the first reference signal at a first polarization of a set of antenna elements at the device, wherein receiving the second reference signal includes receiving the second reference signal at a second polarization of a set of antenna elements at the device, wherein determining the inter-polarization phase adjustment is based on determining a first phase of the first reference signal as received at the first polarization of the set of antenna elements and determining a second phase of the second reference signal as received at the second polarization of a set of antenna elements.

In Aspect 8, the method of any of Aspects 1 to 7 includes wherein the inter-polarization phase adjustment compensates for path distance differences between the first reference signal being based on the first polarization and the second reference signal being based on the second polarization.

In Aspect 9, the method of Aspect 8 includes wherein the path distance differences correspond to a beam angle difference between the first reference signal being transmitted using the first set of antenna elements and the second reference signal being transmitted using the second set of antenna elements.

In Aspect 10, the method of Aspect 9 includes wherein the path distance differences further corresponds to a relative mobility direction of at least one of the first device or a reflector with respect to the second device.

Aspect 11 is a method for wireless communication at a first device including transmitting, to a second device, a first reference signal using a first set of antenna elements of the first device over a first polarization, transmitting, to the second device, a second reference signal using a second set of antenna elements of the first device over a second polarization, receiving, from the second device, an indication of an inter-polarization phase adjustment, and applying, to at least one of the first set of antenna elements or the second set of antenna elements, the inter-polarization phase adjustment for communicating with the second device.

In Aspect 12, the method of Aspect 11 includes communicating with the second device over a dual-polarized link using a beam pair, and receiving, from the second device, a reporting of a rank switch to switch to a rank-one communications, wherein transmitting the first reference signal and the second reference signal are based on receiving the reporting of the rank switch.

In Aspect 13, the method of Aspect 12 includes transmitting, based on receiving the reporting of the rank switch, a configuration indicating different polarization transmission configuration for the first reference signal and the second reference signal.

In Aspect 14, the method of Aspect 13 includes wherein transmitting the first reference signal is based on a first beam indicated in the configuration and transmitting the second reference signal is based on a second beam indicated in the configuration.

In Aspect 15, the method of any of Aspects 11 to 14 includes wherein the inter-polarization phase adjustment compensates for path distance differences between the first reference signal being based on the first polarization and the second reference signal being based on the second polarization.

In Aspect 16, the method of Aspect 15 includes wherein the path distance differences correspond to a beam angle difference between the first reference signal being transmitted using the first set of antenna elements and the second reference signal being transmitted using the second set of antenna elements.

In Aspect 17, the method of Aspect 16 includes wherein the path distance differences further corresponds to a relative mobility direction of at least one of the second device or a reflector with respect to the first device.

In Aspect 18, the method of any of Aspects 11 to 17 includes, based on detecting at least one of a beam pair switch, movement of the second device, or change in a channel environment parameter: transmitting, to the second device, a third reference signal using the first set of antenna elements of the first device over the first polarization, transmitting, to the second device, a fourth reference signal using the second set of antenna elements of the first device over the second polarization, receiving, from the second device, a second inter-polarization phase adjustment, and applying, to at least one of the first set of antenna elements or the second set of antenna elements, the second inter-polarization phase adjustment for communicating with the second device.

Aspect 19 is an apparatus for wireless communication including a transceiver, a memory configured to store instructions, and one or more processors communicatively coupled with the memory and the transceiver. The one or more processors are configured to receive, from a device, a first reference signal transmitted using a first set of antenna elements over a first polarization, receive, from the device, a second reference signal transmitted using a second set of antenna elements over a second polarization, determine, based on the first reference signal and the second reference signal, an inter-polarization phase adjustment to be applied to signals transmitted from the first set of antenna elements or the second set of antenna elements, and transmit, to the device, an indication of the inter-polarization phase adjustment.

In Aspect 20, the apparatus of Aspect 19 includes wherein the one or more processors are further configured to communicate with the device over a dual-polarized link using a beam pair, and report a rank switch to rank-one communications between the apparatus and the device, wherein the one or more processors are configured to receive the first reference signal and the second reference signal based on reporting the switch to the device.

In Aspect 21, the apparatus of Aspect 20 includes wherein the one or more processors are further configured to receive, based on reporting the rank switch to the device, a configuration indicating different polarization transmission configurations for the first reference signal and the second reference signal.

In Aspect 22, the apparatus of Aspect 21 includes wherein the one or more processors are configured to receive the first reference signal based on a first beam indicated in the configuration and receive the second reference signal based on a second beam indicated in the configuration.

In Aspect 23, the apparatus of any of Aspects 20 or 21 includes wherein the one or more processors are configured to report the rank switch at least in part by reporting the rank switch to the device in channel state feedback.

In Aspect 24, the apparatus of any of Aspects 19 to 23 includes wherein the one or more processors are configured to determine the inter-polarization phase adjustment at least in part by determining a phase difference between a first phase of the first reference signal relative to a second phase of the second reference signal.

In Aspect 25, the apparatus of any of Aspects 19 to 24 includes wherein the one or more processors are configured to receive the first reference signal at least in part by receiving the first reference signal at a first polarization of a set of antenna elements at the device, wherein the one or more processors are configured to receive the second reference signal at least in part by receiving the second reference signal at a second polarization of a set of antenna elements at the device, wherein the one or more processors are configured to determine the inter-polarization phase adjustment based on determining a first phase of the first reference signal as received at the first polarization of the set of antenna elements and determining a second phase of the second reference signal as received at the second polarization of a set of antenna elements.

In Aspect 26, the apparatus of any of Aspects 19 to 25 includes wherein the inter-polarization phase adjustment compensates for path distance differences between the first reference signal being based on the first polarization and the second reference signal being based on the second polarization.

In Aspect 27, the apparatus of Aspect 26 includes wherein the path distance differences correspond to a beam angle difference between the first reference signal being transmitted using the first set of antenna elements and the second reference signal being transmitted using the second set of antenna elements.

In Aspect 28, the apparatus of Aspect 27 includes wherein the path distance differences further corresponds to a relative mobility direction of at least one of the apparatus or a reflector with respect to the device.

Aspect 29 is an apparatus for wireless communication including a transceiver, a memory configured to store instructions, and one or more processors communicatively coupled with the memory and the transceiver. The one or more processors are configured to transmit, to a device, a first reference signal using a first set of antenna elements of the apparatus over a first polarization, transmit, to the device, a second reference signal using a second set of antenna elements of the apparatus over a second polarization, receive, from the device, an indication of an inter-polarization phase adjustment, and apply, to at least one of the first set of antenna elements or the second set of antenna elements, the inter-polarization phase adjustment for communicating with the device.

In Aspect 30, the apparatus of Aspect 29 includes wherein the one or more processors are further configured to communicate with the device over a dual-polarized link using a beam pair, and receive, from the device, a reporting of a rank switch to switch to a rank-one communications, wherein transmitting the first reference signal and the second reference signal are based on receiving the reporting of the rank switch.

In Aspect 31, the apparatus of Aspect 30 includes wherein the one or more processors are further configured to transmit, based on receiving the reporting of the rank switch, a configuration indicating different polarization transmission configuration for the first reference signal and the second reference signal.

In Aspect 32, the apparatus of Aspect 30 includes wherein the one or more processors are configured to transmit the first reference signal based on a first beam indicated in the configuration and transmitting the second reference signal is based on a second beam indicated in the configuration.

In Aspect 33, the apparatus of any of Aspects 29 to 32 includes wherein the inter-polarization phase adjustment compensates for path distance differences between the first reference signal being based on the first polarization and the second reference signal being based on the second polarization.

In Aspect 34, the apparatus of any of Aspects 29 to 33 includes wherein the path distance differences correspond to a beam angle difference between the first reference signal being transmitted using the first set of antenna elements and the second reference signal being transmitted using the second set of antenna elements.

In Aspect 35, the apparatus of Aspect 34 includes wherein the path distance differences further corresponds to a relative mobility direction of at least one of the second device or a reflector with respect to the first device.

In Aspect 36, the apparatus of any of Aspects 29 to 35 includes wherein the one or more processors are further configured to, based on detecting at least one of a beam pair switch, movement of the second device, or change in a channel environment parameter: transmit, to the second device, a third reference signal using the first set of antenna elements of the first device over the first polarization, transmit, to the second device, a fourth reference signal using the second set of antenna elements of the first device over the second polarization, receive, from the second device, a second inter-polarization phase adjustment, and apply, to at least one of the first set of antenna elements or the second set of antenna elements, the second inter-polarization phase adjustment for communicating with the second device.

Aspect 37 is an apparatus for wireless communication including means for performing the operations of one or more methods in any of Aspects 1 to 18.

Aspect 38 is a computer-readable medium including code executable by one or more processors to perform the operations of one or more methods in any of Aspects 1 to 18.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication at a first device, comprising:
communicating with a second device over a dual-polarized link using a beam pair;
reporting a rank switch to switch from the dual-polarized link to rank-one communications;
receiving, from the second device and based on reporting the rank switch, a first reference signal transmitted using a first set of antenna elements over a first polarization and
a second reference signal transmitted using a second set of antenna elements over a second polarization; and
transmitting, to the second device, an indication of an inter-polarization phase adjustment to be applied to signals transmitted from the first set of antenna elements or the second set of antenna elements, wherein the inter-polarization phase adjustment is based on a phase difference between the first reference signal and the second reference signal.

2. The method of claim 1, further comprising receiving, based on reporting the rank switch to the second device, a configuration indicating different polarization transmission configurations for the first reference signal and the second reference signal.

3. The method of claim 2, wherein receiving the first reference signal is based on a first beam indicated in the configuration and receiving the second reference signal is based on a second beam indicated in the configuration.

4. The method of claim 1, wherein reporting the rank switch includes reporting the rank switch to the second device in channel state feedback.

5. The method of claim 1, wherein the inter-polarization phase adjustment is based on a phase difference between a first phase of the first reference signal relative to a second phase of the second reference signal.

6. The method of claim 1, wherein receiving the first reference signal includes receiving the first reference signal at the first polarization of the first set of antenna elements at the first device, wherein receiving the second reference signal includes receiving the second reference signal at the second polarization of the second set of antenna elements at the first device, wherein the inter-polarization phase adjustment is based on a first phase of the first reference signal as received at the first polarization of the first set of antenna elements and a second phase of the second reference signal as received at the second polarization of the second set of antenna elements.

7. The method of claim 1, wherein the inter-polarization phase adjustment compensates for path distance differences between the first reference signal being based on the first polarization and the second reference signal being based on the second polarization.

8. The method of claim 7, wherein the path distance differences correspond to a beam angle difference between the first reference signal being transmitted using the first set of antenna elements and the second reference signal being transmitted using the second set of antenna elements.

9. The method of claim 8, wherein the path distance differences further corresponds to a relative mobility direction of at least one of the first device or a reflector with respect to the second device.

10. A method for wireless communication at a first device, comprising:
communicating with a second device over a dual-polarized link using a beam pair;
receiving, from the second device, a reporting of a rank switch to switch from the dual-polarized link to a rank-one communications;
transmitting, to the second device and based on receiving the reporting of the rank switch, a first reference signal using a first set of antenna elements of the first device over a first polarization and
a second reference signal using a second set of antenna elements of the first device over a second polarization;
receiving, from the second device, an indication of an inter-polarization phase adjustment that is based on a phase difference between the first reference signal and the second reference signal; and
applying, to at least one of the first set of antenna elements or the second set of antenna elements, the inter-polarization phase adjustment for communicating with the second device.

11. The method of claim 10, further comprising transmitting, based on receiving the reporting of the rank switch, a configuration indicating different polarization transmission configuration for the first reference signal and the second reference signal.

12. The method of claim 11, wherein transmitting the first reference signal is based on a first beam indicated in the configuration and transmitting the second reference signal is based on a second beam indicated in the configuration.

13. The method of claim 10, wherein the inter-polarization phase adjustment compensates for path distance differences between the first reference signal being based on the first polarization and the second reference signal being based on the second polarization.

14. The method of claim 13, wherein the path distance differences correspond to a beam angle difference between the first reference signal being transmitted using the first set of antenna elements and the second reference signal being transmitted using the second set of antenna elements.

15. The method of claim 14, wherein the path distance differences further corresponds to a relative mobility direction of at least one of the second device or a reflector with respect to the first device.

16. The method of claim 10, further comprising, based on detecting at least one of a beam pair switch, movement of the second device, or change in a channel environment parameter:
transmitting, to the second device, a third reference signal using the first set of antenna elements of the first device over the first polarization;
transmitting, to the second device, a fourth reference signal using the second set of antenna elements of the first device over the second polarization;
receiving, from the second device, a second inter-polarization phase adjustment; and
applying, to at least one of the first set of antenna elements or the second set of antenna elements, the second inter-polarization phase adjustment for communicating with the second device.

17. An apparatus for wireless communication, comprising:
  a transceiver;
  a memory configured to store instructions; and
  one or more processors communicatively coupled with the memory and the transceiver, wherein the one or more processors are configured to:
    communicate with a device over a dual-polarized link using a beam pair;
    report a rank switch to switch from the dual-polarized link to rank-one communications;
    receive, from the device and based on reporting the rank switch, a first reference signal transmitted using a first set of antenna elements over a first polarization and
    a second reference signal transmitted using a second set of antenna elements over a second polarization; and
    transmit, to the device, an indication of an inter-polarization phase adjustment to be applied to signals transmitted from the first set of antenna elements or the second set of antenna elements, wherein the inter-polarization phase adjustment is based on a phase difference between the first reference signal and the second reference signal.

18. The apparatus of claim 17, wherein the one or more processors are further configured to receive, based on reporting the rank switch to the device, a configuration indicating different polarization transmission configurations for the first reference signal and the second reference signal.

19. The apparatus of claim 18, wherein the one or more processors are configured to receive the first reference signal based on a first beam indicated in the configuration and receive the second reference signal based on a second beam indicated in the configuration.

20. The apparatus of claim 17, wherein the one or more processors are configured to report the rank switch at least in part by reporting the rank switch to the device in channel state feedback.

21. The apparatus of claim 17, wherein the inter-polarization phase adjustment is based on a phase difference between a first phase of the first reference signal relative to a second phase of the second reference signal.

22. The apparatus of claim 17, wherein the one or more processors are configured to receive the first reference signal at least in part by receiving the first reference signal at the first polarization of the first set of antenna elements at the apparatus, wherein the one or more processors are configured to receive the second reference signal at least in part by receiving the second reference signal at the second polarization of the second set of antenna elements at the apparatus, wherein the inter-polarization phase adjustment is based on a first phase of the first reference signal as received at the first polarization of the first set of antenna elements and a second phase of the second reference signal as received at the second polarization of the second set of antenna elements.

23. The apparatus of claim 17, wherein the inter-polarization phase adjustment compensates for path distance differences between the first reference signal being based on the first polarization and the second reference signal being based on the second polarization.

24. The apparatus of claim 23, wherein the path distance differences correspond to a beam angle difference between the first reference signal being transmitted using the first set of antenna elements and the second reference signal being transmitted using the second set of antenna elements.

25. The apparatus of claim 24, wherein the path distance differences further corresponds to a relative mobility direction of at least one of the apparatus or a reflector with respect to the device.

26. An apparatus for wireless communication, comprising:
  a transceiver;
  a memory configured to store instructions; and
  one or more processors communicatively coupled with the memory and the transceiver, wherein the one or more processors are configured to:
    communicate with a device over a dual-polarized link using a beam pair;
    receive, from the device, a reporting of a rank switch to switch from the dual-polarized link to a rank-one communications;
    transmit, to the device and based on receiving the reporting of the rank switch, a first reference signal using a first set of antenna elements of the apparatus over a first polarization and
    a second reference signal using a second set of antenna elements of the apparatus over a second polarization;
    receive, from the device, an indication of an inter-polarization phase adjustment that is based on a phase difference between the first reference signal and the second reference signal; and
    apply, to at least one of the first set of antenna elements or the second set of antenna elements, the inter-polarization phase adjustment for communicating with the device.

27. The apparatus of claim 26, wherein the one or more processors are further configured to transmit, based on receiving the reporting of the rank switch, a configuration indicating different polarization transmission configuration for the first reference signal and the second reference signal.

28. The apparatus of claim 27, wherein the one or more processors are configured to transmit the first reference signal based on a first beam indicated in the configuration and transmit the second reference signal based on a second beam indicated in the configuration.

29. The apparatus of claim 26, wherein the inter-polarization phase adjustment compensates for path distance differences between the first reference signal being based on the first polarization and the second reference signal being based on the second polarization.

30. The apparatus of claim 29, wherein the path distance differences correspond to a beam angle difference between the first reference signal being transmitted using the first set of antenna elements and the second reference signal being transmitted using the second set of antenna elements.

* * * * *